March 17, 1964 J. K. WILLIS 3,125,311
MOTOR REDUCTION SYSTEM COUPLING DEVICE
Filed Sept. 12, 1960
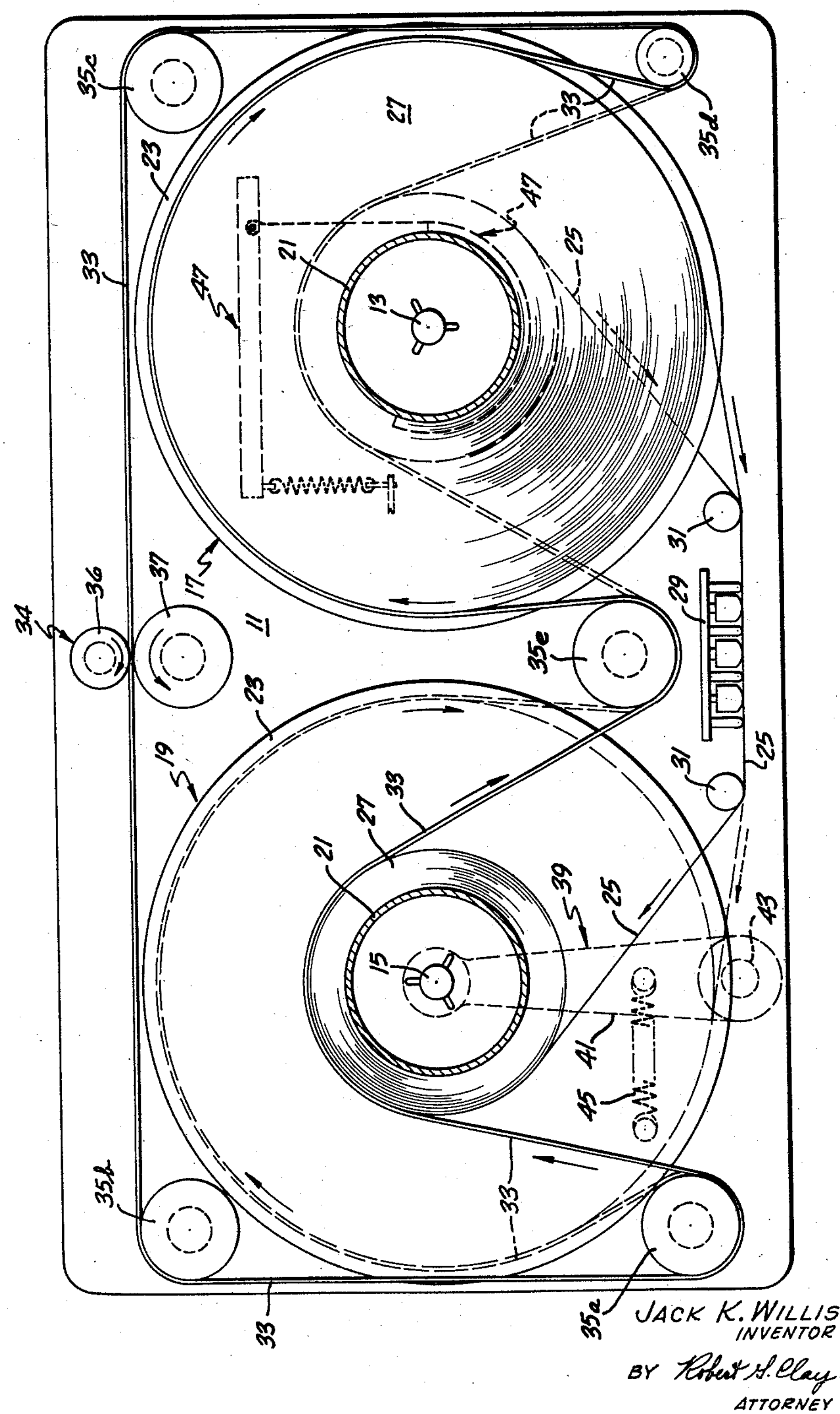
JACK K. WILLIS
INVENTOR
BY Robert G. Clay
ATTORNEY United States Patent Office 3,125,311

Patented Mar. 17, 1964

3,125,311

MOTOR REDUCTION SYSTEM COUPLING DEVICE

Jack K. Willis, San Bruno, Calif., assignor to Ampex Corporation, Redwood City, Calif., a corporation of California Filed Sept. 12, 1960, Ser. No. 55,266
4 Claims. (Cl. 242—55.14)

This invention relates generally to apparatus for moving a flexible tape from a first station to a second station, which apparatus is generally referred to as tape-transport systems, and more particularly the invention relates to an improved means in a tape-transport system for causing such tape to be wound upon and unwound from a tape-supporting reel.

Very generally, a tape-transport system of the kind normally used in magnetic tape recorders and the like comprises a pair of tape-supporting reels rotatably mounted on a supporting plate or platform, and a flexible tape extending between and adapted to be wound upon and unwound from these reels. A transducing means, such as magnetic recording and reproducing heads, are positioned adjacent the path the tape follows as it passes between the reels, and are adapted to record or reproduce information on the tape.

In previously available tape-transport systems, the tape is normally caused to move between the reels by a capstan and idler wheel arrangement. The capstan is a cylinder which is rotatably mounted on the platform and driven by a suitable power means. The idler wheel is generally rotatably mounted adjacent the capstan on a bracket which is spring-loaded by a suitable biasing means in order to cause the idler wheel to be urged in the direction of the capstan. The tape passes between the idler wheel and the capstan and the pressure exerted by the biasing means on the idler wheel bracket assures a frictional contact between the capstan and the tape. The tape is thus caused to travel when the capstan revolves.

During the record or reproduce modes of operation of the recorder, it is essential that there be a constant tension on the tape as it passes between the reels. To provide this tension, a torque-exerting means is normally provided for each reel. The reel which is discharging tape, i.e., the supply reel, is connected to a means which exerts a rotational torque on the reel in a direction opposite to the direction in which this reel rotates as tape is being unwound therefrom. The reel which is receiving the tape, i.e., the take-up reel, is connected to a means which exerts a torque in a direction such as to wind the tape thereon. The torque-exerting means insures that the tape will pass through the system without the occurrence of variation in tension.

The tension exerted on the tape at any time by either reel is a function of the torque exerted and the radius of the tape mass presently on the reel. Since it is desired to maintain the tension constant so as to achieve uniform operating conditions for the apparatus, the torque must vary with the radius of the tape mass at any particular time. It has been found that the most desirable manner of accomplishing a variable torque is to provide a slipping-clutch arrangement for each reel, and such an arrangement has been widely adapted in the tape-transport art.

While the tape-transport systems presently in use have proved to be satisfactory, there are certain disadvantages inherent in their operation. The use of a slipping clutch, for example, is highly inefficient since it involves a considerable loss of power. The presence of a slippage necessitates a prime mover having a much greater capacity than would normally be necessary. In addition, the use of slipping clutches adds considerably to the cost of the system, and generally requires a torque-producing means for each reel in addition to the clutch.

Further, with the use of a slipping clutch, the tape which is being wound upon the reel experiences considerable sliding of the convolutions over one another as the tape which is being supported on the reel is caused to become tightened. This in time may cause the tape to become scratched or otherwise injured.

A still further disadvantage of the presently used tape-transport system stems from the use of the capstan and idler wheel arrangement to move the tape. One of the requirements of a capstan-drive system is a frictional contact between the tape and the capstan and, as has already been mentioned, this is achieved by passing the tape between the capstan, and the idler wheel which exerts a pressure in the direction of the capstan. When the conditions of temperature and humidity are unfavorable, this pressure may cause an elongation of the tape, or may hasten the disintegration of some of the binding materials which hold the magnetic particles to the tape. In addition, vibrations of the capstan and motor in a system having a capstan-driven tape may be transferred directly to the tape, thus causing poor fidelity in the operation of the apparatus in which the tape is used.

Very generally, a tape-transport system in accordance with the present invention comprises a continuous belt which contacts a portion of the tape supported on both the supply and take-up reels. The belt is disposed in such a manner that when it is moved lengthwise it will cause the tape to unwind from the supply reel and wind upon the take-up reel.

Accordingly, the principal object of this invention is to provide a novel means of transporting tape. An additional object of this invention is to provide a tape-transport system in which a novel means is used for causing the tape to be wound upon and unwound from a tape-supporting reel. A further object of this invention is to provide a tape-transport system in which tension can be maintained on the tape without the use of separate means for exerting a positive torque on each reel. A particular object of the invention is to provide a tape-transport system in which the tape may be wound upon or unwound from a tape-supporting reel by means of a continuous belt which is in contact with a portion of the tape wound upon the reel. A still further object of the invention is to provide a system for transporting tape which can be easily and economically produced, and which can be operated with a minimum of maintenance.

Other objects and advantages of the invention will become apparent with reference to the following description and an accompanying drawing which shows a plan view of a tape-transport system which includes a preferred embodiment of the present invention.

The figure is a plan view showing the device, with parts obscured shown in broken lines.

With reference now to the drawing, the illustrated system for the transport of tape includes a plate or platform 11 having a pair of shafts 13 and 15 rotatably mounted therein in spaced-apart relationship. A reel 17, hereinafter referred to as the supply reel, is keyed to the shaft 13, and a similar reel 19, hereinafter referred to as the take-up reel, is keyed to the shaft 15. Each reel comprises a cylindrical hub 21 having a flange 23 extending radially outwardly from each of its ends.

A flexible tape 25 extends between the reels 17 and 19, and has a portion of its length wound upon each of the reel hubs to form a tape mass 27 of varying size upon each hub. Generally, the tape used in a tape-transporting system has a sensitive surface, for example, the tape used in a magnetic tape recorder has a surface coated with a ferro-magnetic material. When such is the case, it has been found desirable in a system such as the one being described, to cause the tape to be wound upon the hub in such a manner that the sensitive surface faces the center of the hub. In this manner, and for reasons which will soon become apparent, the outer wrap of the tape mass 27 will not have an exposed sensitive surface.

Disposed along the path which the tape follows as it passes between the reels, and adjacent the sensitive surface of the tape, are conventional transducing or magnetic heads 29 which record or reproduce information on the tape. A pair of conventional tape-guiding wheels 31 are rotatably disposed on the platform 11 and on opposite sides of the transducing heads 29 to provide support and alignment for the tape.

In order that the tape 29 may be caused to be wound upon and unwound from the reels 17 and 19, a continuous belt 33 is provided. In the preferred embodiment, the belt 33 is shown as extending around a portion of the tape mass 27 of each reel hub, and as being supported at various points along its length by belt-supporting wheels 35. In the embodiment shown, the belt 33 is in contact with the non-sensitive surface of the outer wrap of the tape mass 27. In this manner, the sensitive surface is not contacted by the belt 33, and any tendency of the belt to injure this surface of the tape is thus prevented.

The belt 33 is preferably fabricated of a somewhat resilient material, such as a rubberized fabric, or a plastic, so that it might be capable of elongating while the system is in operation, and also to assure that certain portions of its length may be in tension when desired. The width of the belt is substantially the same as that of the tape 25 so that the belt may fit easily between the flanges 23 of the reels.

While it may be possible to design various embodiments of a system for transporting tape in accordance with the present invention, a design such as that shown in the preferred embodiment has been found quite satisfactory. In this embodiment, a series of belt supporting wheels, designated **35*a*, 35*b*, 35*c*, and 35*d* are disposed on the platform 11 with one wheel positioned adjacent each corner of the platform. An additional wheel 35*e*, is mounted on the platform intermediate the reels. The belt passes around the outer periphery of each of the four corner-mounted wheels, passes around a portion of the tape mass 27 supported on each reel, and then surrounds a portion of the intermediate wheel 35*e*. In this manner, the belt will cause the reels to rotate in such a direction that the tape 25 will unwind from the supply reel and wind upon the take-up reel. This embodiment makes it possible for that portion of the tape 25 which extends between the reels to be out of contact with the belt and also provides a space wherein the transducing heads 29** may be located. In the accompanying drawing, dotted lines are included to represent certain positions of the tape and belt when the major portion of the tape has been transferred to the take-up reel.

In order that the belt 33 may be moved along its path so as to cause the tape 25 to be wound upon and unwound from the reels 17 and 19, a belt driving means 34 is provided. The means 34 comprises a cylinder 36 rotatably mounted on the platform 11 adjacent the path which the belt 33 will follow. The cylinder 36 is driven by a suitable motor means (not shown) which is provided with a variable speed control so that it might move the belt at one speed during the recording or reproducing modes of operation of the recorder, and at a second and somewhat higher speed during the fast-forward mode of operation of the apparatus. The motor means preferably includes as well a reversing switch for the rewind mode of operation.

An idler wheel 37 is rotatably mounted adjacent the cylinder 36 and is disposed such that the belt 33 will pass between the idler wheel 37 and the driven cylinder 36. The idler wheel 37 is preferably rotatably mounted on a bracket arm (not shown) which is spring loaded by a suitable biasing means (not shown) so as to urge the idler wheel toward the driven cylinder 36, thus insuring a pressure contact between the cylinder and the belt.

While the tape-transport system illustrated in the accompanying drawing shows the belt 33 moved by a driven cylinder and idler wheel arrangement, other means of moving the belt are possible. For example, the belt might be moved by supplying a belt-driving wheel in place of one of the belt supporting wheels 35 at a point where the direction of motion of the belt changes. This design would be best accomplished through the use of one of the wheels designated **35*a* and 35*d* which contact the belt either immediately before or immediately after the belt contacts the tape on the reels. These wheels have been found preferable since they are encompassed by a greater portion of the belt and hence will have less tendency to slip. In this manner, if the tension of the belt is sufficient, it would be possible to move the belt without the use of the spring-loaded idler wheel 37** or an additional driven cylinder.

As the tape is transferred from one reel to the other, the length of belt required to encompass a portion of the tape mass of each reel will vary with the distribution of the tape. This is true because the length of belt required is a function of the sum of the average diameters of the tape mass on each reel, and this sum is less when most of the tape is on one reel than it is when the tape is evenly distributed between the two reels. Accordingly, it is desirable to compensate for this variation so that the belt may be kept in constant tension.

There are a number of ways to provide this adjustment; for example, the belt may be made of an elastic material such as rubber, which would stretch and contract as necessary. A second means might be to use an inelastic belt and to fasten certain of the belt contacting components of the system to the platform in such a manner that they might move between two positions as required.

In the preferred embodiment shown in the accompanying drawing, the reel 19 is adapted to be moved toward or away from the reel 17 by a compensating means 39. This means comprises generally an arm 41 pivotally attached to the platform 11 by means of a pivot rod 43. The reel 19 is rotatably mounted at the upper end of the arm 41 such that when the arm pivots about the rod 43, the reel 19 will be moved relative to the reel 17. A biasing means 45 causes a force to be exerted on the arm 41 which will cause the reel 19 to be urged away from the reel 17. In this manner, the variation in the length of belt required is compensated.

It has been found that the most satisfactory performance of a system for transporting tape occurs if there is a constant tension on the tape, since this will prevent tape slack. In the preferred embodiment the tape tension is created by applying a braking force to the supply reel 17 by a brake means 47. Brake means for tape-transport reels are well-known in the art and need not be described here further in detail. It should be noted, however, that other means for providing tension to the tape are possible. For example, similar results might be obtained by providing a braking action at the belt-supporting wheel **35*a* located immediately preceding the take-up reel 19 or at the wheel 35*d* immediately following the supply reel 17**. This would provide a holding action on the belt at these points and cause the supply reel to tend to revolve at a somewhat slower speed.

It can be seen therefore that the reels 17 and 19 are caused to rotate by movement of the belt 33, and the tape is so arranged on the reels that it will unwind from one reel and wind upon the other. In addition, the brake means 47 maintains a constant tension on the tape so that no tape slack will occur in the tape during the operation of the system. Further, the means whereby the reel 19 is allowed to move so as to compensate for a distribution of the tape on the reels insures that there will always be some tension on the belt 33.

It will be noted that the reels 17 and 19 receive their driving impetus from the belt 33 at the periphery of the tape mass 27 which is wound upon the reel hubs rather than from a driven shaft passing through the center of the hub and to which the hub is keyed. There is a mechanical advantage involved when using this method of supplying power to the reels which is not available in the system in which a torque is supplied to the reels at their center, since the distance between the applied force and the axis about which the reel revolves is much greater. Further, since this mechanical advantage is a function of the size of the tape mass 27, the power supplied to the reel will increase as the mass of the reel and tape increases. In this manner, power loss in the system is held to a minimum.

An improved means for causing a tape to be moved from a firset station to a second station has thus been described. The means utilizes a novel manner of moving the tape and makes it possible to eliminate some of the components heretofore used in such a system, for example, slipping clutches or separate motors for the reels. It also aids in minimizing the power necessary to drive the system.

Various of the features of the above-described invention are set forth in the following claims:

What is claimed is:

1. In a tape-transport system having a pair of tape-supporting reels and a flexible tape extending between and wound upon said reels, means for causing said tape to be transferred from one of said reels to the other, said means comprising a continuous inelastic belt surrounding at least a portion of the tape supported on each of said reels, at least one rotatable member positioned adjacent a point on the path defined by said belt so as to provide support for said belt at said point, power means in contact with said belt for causing driving movement thereof, said belt being arranged on said reels such that movement of said belt causes said reels to rotate in the same direction, said tape being wound upon said reels such that said rotation will cause the tape to be unwound from one reel and wound upon the other reel, means for retarding movement of said belt at the reel from which the tape is being unwound, and a compliance arm and spring for said compliance arm, the reel upon which said tape is wound being mounted at the end of said compliance arm, and said spring being arranged to urge said arm and last-named reel in a direction to tension said tape.

2. Tape transfer means as claimed in claim 1, and further characterized in that transducing means are provided for engaging said tape between said reels, and particularly the side of said tape that faces radially inwardly on said reels.

3. Tape transfer means as claimed in claim 2, and further characterized in that said belt forms a continuous loop lying entirely on the sides of said reels that are opposite said transducing means, whereby the threading of said tape is simplified.

4. Tape transfer means as claimed in claim 3, and further characterized in that said power means includes a capstan engaging and driving said belt on the side of said loop opposite said reels; and said means for retarding movement of said belt includes a friction brake coupled directly to said reel from which said tape is being unwound.

References Cited in the file of this patent

UNITED STATES PATENTS

| | | |
|---|---|---|
| 1,806,375 | Tiedeman | May 19, 1931 |
| 2,741,439 | Dale et al. | Apr. 10, 1956 |
| 2,743,878 | Masterson | May 1, 1956 |

FOREIGN PATENTS

| | | |
|---|---|---|
| 270,050 | Great Britain | May 5, 1927 |
| 36,634 | Sweden | Jan. 22, 1923 |